June 28, 1932.    H. KARL    1,865,014
AUTOMATIC DEVICE FOR HORSELESS VEHICLES FOR THE PROTECTION
OF PEDESTRIANS AND THE VEHICLE ITSELF
Filed Sept. 2, 1930    2 Sheets-Sheet 1
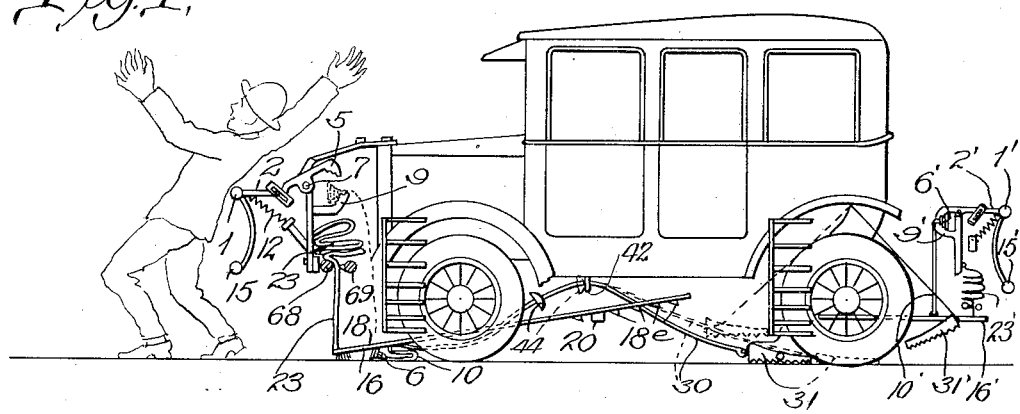
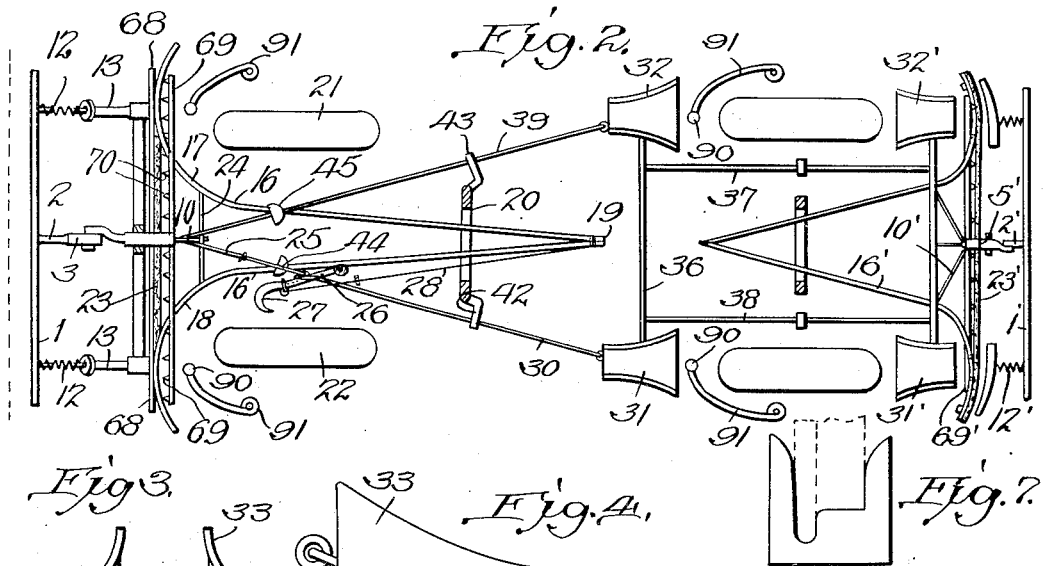
Inventor
Heinrich Karl

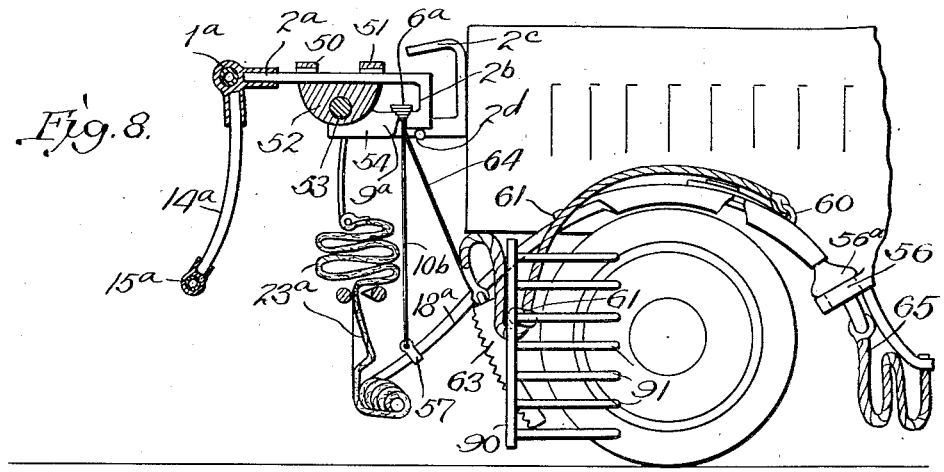
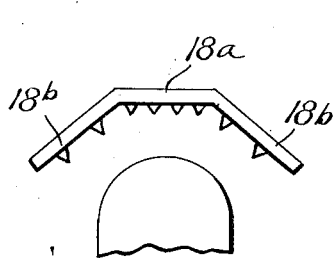
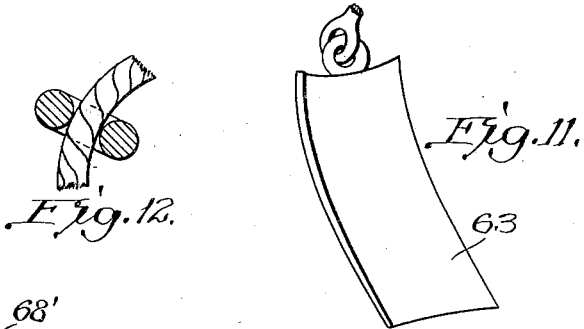
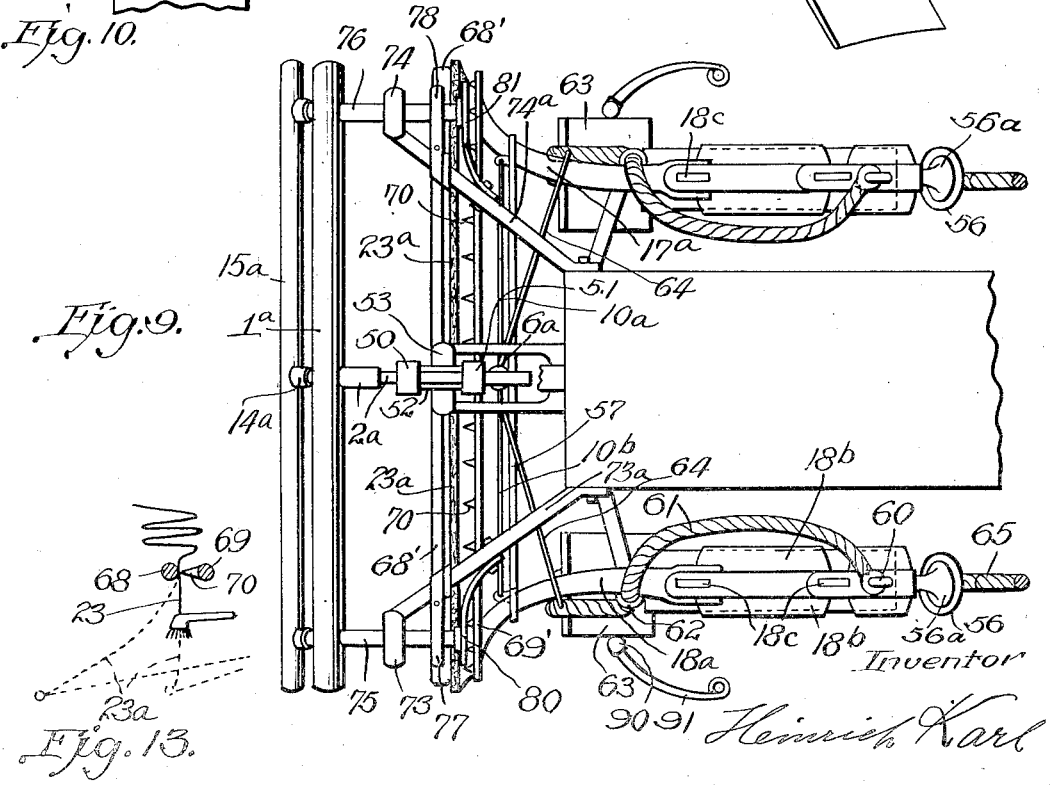

Patented June 28, 1932

1,865,014

UNITED STATES PATENT OFFICE

HEINRICH KARL, OF JERSEY CITY, NEW JERSEY

AUTOMATIC DEVICE FOR HORSELESS VEHICLES FOR THE PROTECTION OF PEDESTRIANS AND THE VEHICLE ITSELF

Application filed September 2, 1930. Serial No. 479,201.

This invention relates to a simple device for installation on automobiles, motor trucks and like vehicles, and in a modified form also on electric street cars, etc., for preventing the injuring and killing of pedestrians when struck by said vehicles, and said device also serves for the protection of the automobile or motor truck, etc. against damage when it collides with another vehicle, a stable structure, or tree trunk, etc. More particularly, this device embraces means for preventing a pedestrian, who has been struck by an automobile or motor truck equipped with said device, from being run over by the wheels of said automobile or motor truck, etc., whereby also a blanket of cloth or rubber, or a canvas will be spread to a certain extent in front of the front wheels of the automobile, etc. in such manner that the falling person who has been struck will not only fall upon said blanket so that the clothes, etc. will not be soiled, but his fall will be softened by the blanket, etc., which will not lie directly on the ground, thus preventing injuries to said person. Associated with this means is also an automatic brake device, one modification of which consists of wedge shoes that will move in case of such accident against the rear wheels of said automobile, etc. in such manner that they will be wedged between the wheel rim (the tire) and the ground and so stop the wheel soon from turning, whereby the automobile, etc. will be brought to a stop. Similar means are also employed on the rear of the automobile, etc. for protecting persons and the automobile when it moves backward. More features will be shown in the following detailed description and pointed out in the appended claims.

In the drawings—

Figure 1 represents a side view of an automobile which is equipped with said device and illustrates the functioning (especially in the first stage) when a person is struck by the automobile;

Figure 2 is a plan or top view of an automobile with nearly all parts removed, excepting the wheels, for showing the parts of this invention and the mode of arrangement;

Figures 3 and 4 are two different views of one of the wedge shoes for automobiles and trucks;

Figure 5 shows the mechanism in direct connection with the foremost bar which persons would grasp, or which is the part that will strike first a person or another vehicle, etc. at the occurrence of such accident;

Figure 6 is the front view of a detail (the plug and the pincer-like parts that hold it) which is also shown in side view in Figure 5;

Figure 7 is a rear view of a modification of the wedge shoe when it is employed on electric street cars;

Figure 8 shows in elevation the front part of a motor truck wherein the invention is applied in a somewhat modified form and which is insofar simplified because the braking of the vehicle and the forward-pushing and spreading of the blanket is all performed only in connection with one pair of wheels (the front wheels);

Figure 9 is a plan or top view of the modification shown in Figure 8;

Figures 10, 11 and 12 are details of parts employed in connection with the modification of Figures 8 and 9; and Figure 13 illustrates diagrammatically the mode of stretching the blanket, first for preventing a person who has been struck by the vehicle from getting hurt by the wheels, and secondly for softening the fall of the person whereby the blanket will be stretched more horizontally.

The foremost bar 1, which may be hollow if made of metal, extends laterally from a point that is still further outside of the vertical plane of the left-side front wheel of the automobile, truck, trolley car, etc. to a point that is also farther outside of the vertical plane of the right-side front wheel thereof. This bar should be surrounded by a rubber layer or by cloth 1f so that persons who might be struck by it will not be hurt or injured. At its middle part bar 1 is connected at right angles by the bar 2 which forms at its other end a slotted guide 3 in which is slidably arranged the part 4 which is mounted on the pivot 4a of the pincer-like part 5 of the holding device for the plug 6. This part 5 is pivoted at 7 to a frame part 8 to which is also rigidly fastened the stable cooperating pincer-like part 9 which serves together with part 5 for holding the conical plug 6. Plug 6 is preferably circularly grooved on its conical side, as best shown in Figure 5, and the parts of the pincers 5 and 9 which touch that plug must have also such grooves that must fit to the elevations formed between the grooves on the plug 6. It is important that the vertical walls formed by said grooves are so positioned and made with respect to the pivotal point 7 of part 5 that a pull exerted from the right upon the plug 6 will not cause the moving of part 5 around its pivot 7 (see Figure 5). This pull must be horizontal in this instance and in order to prevent the rope, chain, or wire that is led downward to exert that pull from below the stable pincer-like part 9 receives an extension 11 over which rope 10 is passed. The outer edges of the grooves of part 9 may be rounded. At the sides bar 1 is supported by the springs 12 which are very flexible and bendable. A suitably arranged extension 13 serves as support for the spring 12. Connected to bar 1 are extensions 14 to which is fastened the laterally extended bar 15 which serves the same purpose as bar 1, namely as the means that is to be grasped by a person when struck by the vehicle that is equipped therewith. Bar 15 might therefore serve for being grasped by children since it is arranged on a lower level than bar 1 that is arranged for being grasped by taller persons, such as adults. This bar 15 should also be surrounded with a layer of rubber or cloth like bar 1. It has been mentioned already that a pull will be exerted from the right upon rope 10, as will be shown later, and as this pull is relatively strong it is evident that the pincer-like part 5 is being pulled also to the right, but as pivot 7 holds it, it means therefore also a holding of the plug 6. The so far described construction is made so that an occasional shock of the vehicle, such that happens when the vehicle moves with one or several of its wheels over a stone, or when it sinks into a hole in the road, etc., will not cause the moving of the pincer-like part 5 around its pivot 7 and therefore plug 6 will not be released. In this instance, spring 12 acts as a shock absorber and when a heavy shock takes place bars 1 and 15 and associated parts therewith, such as rod 2, guide 3, and part 4, will be moved somewhat around the pivot 4a without bringing the pincer-like part 5 out of its position in which it holds the plug 6. It is, however, different when bar 1 will be pushed to the right, say, by a person that is being struck thereby, or when somebody grasps the bar 1 or 15, because in the first instance of "pushing" bar 1, the guide 3 moves to the right whereby the left end of the guide pushes against part 4 which in turn exerts that pressure upon the pivot 4a, thus bringing forcibly the pincer-like part 5 out of its normal position by moving the left end downward, as indicated by the dotted lines in Figure 5, whereby the right end of part 5 moves up and thereby releases the plug 6 which then yields to the pull exerted upon it by rope 10. A similar function takes place when the bar 1 or 15 will be grasped because a push is exerted thereupon both from above and from the left and the spring 12 will be bent downwardly and will take an approximate position, as indicated by 12' (see also Figure 5). The downward pulling of bar 1 or bar 5 acts directly upon the pivot 4a whereby part 5 comes also out of its position in which it holds the plug 6 and it is therefore not necessary that the guide 3 moves so far to the right that part 4 is touched by the left end thereof. In this case the pressure upon pivot 4a is exerted directly from above.

The rope or chain or wire 10 is fastened by its other end to a device 16 that is held by rope 10 in a suspended position. This device 16, which is shown in Figures 1 and 2, consists of two wooden or metallic curved bars or shanks 17 and 18 that are linked together or suitably held together at 19. They are supported near the point 19 by hangers 20, but they are not fastened to them. In their extension towards the front of the vehicle they are so formed that they are separated more from each other in the parts that are situated in front of the front wheels of the vehicle. At this point they make a large bow so that the front wheels 21, 22 will not be hampered in making their movements when they are steered. The front ends of shanks 17 and 18 reach points that lie further outward than the vertical plane of the respective front wheels and those points may be even further outward than the vertical plane of the rear wheels as it will be the case with automobiles or motor trucks. The front ends of the shanks 17 and 18 hold the lower corners of the blanket 23 that is stretched out by its lower edge between them. The upper part of this blanket might be rolled up, but it is preferable that it is only folded (plied) up in such manner that it will be unfolded in the most rapid manner when a collision, as aforesaid, occurs. The upper end of the blanket 23 that may have a rectangular shape may be suitably fastened to the underside of the vehicle body or to the front bumper d, or to bar 15, or to any other suitable part in the front of the vehicle. Rope or chain or wire 10 is fastened at the rib or crossbar 24 that holds the two shanks 17 and 18. From the previous description it is already seen that whenever plug 6 is released the front part of device 16 will fall immediately to the ground (see Figure 1) and will thus prevent the person that has been struck by said vehicle from getting under the wheels of this vehicle because blanket 23 forms then a protecting curtain. The device 16 cannot be moved backwards when its front part lies on the ground because hooks or teeth 18e that are directed somewhat backward and that are arranged on the underside of the shanks 17, 18 will hook in on the support 20 whereby these shanks are allowed to move forward when pulled in that direction. In order to prevent the blanket itself from getting under the wheels, the following arrangement is made that is illustrated in Figures 1, 8 and 13. It consists of two parallel arranged bars 68, 69 which might extend in the same direction as the front bumper, if there is any, and they might be in front or somewhat underneath that front bumper. The bar indicated by 69, which is the rear one, is provided with teeth or hooks that are directed towards bar 68 which is completely even and which should be preferably of rounded shape, as shown. Between bars 68 and 69 there should be only as much room as to permit the blanket 23 (or 23a, see Figures 8 and 9) that is passed between these two bars 68, 69 to move freely if pulled down in a vertical direction or forward by the device 16 (Figures 1 and 2), or by the bars 17a and 18a of Figures 8 and 9 which will be described later. If, however, the blanket 23 (or 23a of Figures 8 and 9) is pushed backwards by a person that has been struck by the vehicle the blanket will hook itself fast on the teeth or points 70 of bar 69, the result being the stretching of that portion of the blanket situated between its lower edge then lying on the ground and the line on which the teeth or points hook in on the blanket. Sufficient resistance is thus afforded by the blanket for preventing its moving under the wheels and consequently also that of a person pressing against it. Blanket 23 (23a) will be unhooked from the teeth 70 when the device 16 moves forward, as will be explained subsequently, and in this instance said blanket can be spread with its nearly full length in front of the vehicle. The rear (or under) side of the blanket should be roughened or provided with holes that allow the teeth or points 70 to penetrate therein. The foremost part of the shanks 17, 18 might be surrounded by cloth or rubber, or the underside thereof might be formed as brushes with strong fibres so that these parts will be given a certain amount of give when they are in their released position in which they encounter unevenness of the ground.

As it is desirable to protect the persons also from injuries during the falling thereof, a mechanism is made in connection with the device 16 that will move the blanket 23 as far to the front that the person will fall upon it and as in this instance the blanket will be stretched there will be a space left between the ground and the blanket which softens the fall of the person that has been struck by the vehicle. The device that moves the shanks forward and thereby spreads out and stretches the blanket 23 consists of the following simple means. Connected to rope 70 or chain or wire 10 is another rope or chain or wire 25 that is connected to a pivoted or linked lever 26. This lever 26 is so held in respect to one of the front wheels that its free end will strike the spokes of this wheel when rope 10 is released. The moving of lever 26 in that manner may be obtained in various ways as, for instance, by means of a spring, but I prefer to make it in a simpler way, as will be shown hereinafter in connection with rope or chain or wire 30 and wedge shoe 31. On the free end of lever 26 a hook 27 is placed but not rigidly fastened thereto and the point of the hook is so directed that it will hook itself on one of the spokes of that front wheel that is vertically positioned at that moment and above the axle of that wheel when ropes 10 and 25 will be released. In cases where no spokes are employed it might as well be the tire of the front wheel into which the hook may hook. Fastened to hook 27 is a rope or chain or wire 28 which is also fastened to the rearmost ends of the shanks 17 and 18, that is at the point 19. Whenever ropes 10 and 25 are released and the lever 26 moves towards the respective front wheel, which in Figure 2 is the left side one, hook 27 hooks itself on one of the spokes of that wheel in the aforesaid manner whereby the turning wheel separates the hook 27 from the lever 26 and moves it around whereby the rope 28 will be pulled which slides then on top of the wheel axle and in turn pulls the shanks 17, 18 forward which thereby spread and also stretch the blanket 23.

So far the means have been described that actuate the safety devices. It is, however, necessary to bring also the vehicle to a quick stop, but as the driver of an automobile or truck or of a trolley car may not have presence of mind enough to act as rapidly, such action must be automatic and the following simple means are employed in this respect.

Connected to lever 26, preferably by a sling near the point where the hook 27 is placed, is a rope, chain, or wire 30, which is fastened to one of the wedge shoes that serve for stopping the vehicle. There are preferably two of these wedge shoes which are indicated by 31, 32 when it is the case with automobiles or motor trucks, but on trolley cars and the like vehicles there may be more employed and the wedge shoe will have a shape that is somewhat different from that of the wedge shoe employed for stopping automobiles and motor trucks (see Figure 7).

The wedge shoe for the automobile and motor truck is shown in Figure 3 and Figure 4 and consists of the part 33 that clamps itself on the wheel, its tire, respectively, and the bottom part 34 that is provided with teeth 35 of a flat angular shape for gripping on the ground without, however, digging in which might cause the vehicle to somersault.

Part 33 can be made of flexible steel while the teeth 35 can be made of iron. Both wedge shoes 31, 32 are held by a wooden or steel bar 36 in such position in which they face the wheel rims or tires with the broader part of 33 which is the rear end of the wedge shoe. Fastened to bar 36 are ropes or wires or chains 37, 38 of certain length which are also fastened at a suitable place of the vehicle body or at the inner edges of the mud-guards of the rear wheels.

To wedge shoe 32 (see Figure 2) is connected a rope or wire or chain 39 that is also connected to rope 10 and in case where rope 10 will be released will also rope 39 be released as well as rope 30, as has been pointed out previously. The wedge shoes 31, 32 then move to the ground and the turning rear wheel moves right into the space 40 (see Figure 3) and clamps itself fast at the narrower part form by 33. The wedge shoes thus hold the rear wheels and slide on the ground for a distance that depends upon the momentum of the vehicle whereby the rear wheels will not touch the ground. In order to prevent these rear wheels breaking the ropes or chains or wires 30, 39 and simply take the wedge shoes around them these ropes 30, 39 should be of great strength and besides that a special means must be employed in the form of rings 42, 43 through which the ropes 30, 39, respectively, are passed.

Rings 42, 43 are fastened to the hangers 20, but they may be fastened to any other suitable part of the chassis or car body. At a certain stretch in advance of the rings 42, 43 plugs 44, 45 are fastened to the ropes 30, 39, respectively, and these plugs must be so big that they cannot pass through the ring holes of 42 and 43. The distance between the plug 44 or 45 from its ring 42, 43, respectively, must correspond therefore with the distance that lies between the front part of the wedge shoe 31, 32, respectively, and the lowermost part of the respective rear wheels when the wedge shoes are in their normal, suspended position. It will be noted from Figure 2 that plug 44 is not directly fastened to rope 30, but to a special branch rope. To rope 30 is therefore fastened another rope. Lever 26 itself will not be engaged by any part of the left side front wheel when it will be released, but it will simply move backwards as far as rope 30 will pull it whereafter rope 30 will slip out and separate itself from lever 26.

From the foregoing description it is shown that all essential parts are so suspended that they will go to active position through the safest medium in this respect, namely through gravity and that it is performed in a most rapid manner.

It is necessary that for certain vehicles such as trolley cars, wedge shoes must be employed that have a shape different from those employed with automobiles, motor trucks, etc. In connection with them no teeth 35 are necessary and it will not be necessary that they have a broadened and a narrow upper part like those employable for automobiles.

It is also necessary that there is protection for the pedestrian when automobiles or motor trucks move backwards. In this respect a bar 1' and another one 15' that is associated therewith may be employed and a similar mechanism be brought in connection therewith, as has been described previously. In order to indicate those parts that have similar functions or uses as has been set forth in connection with the parts in the front of the vehicle, the same respective numeral is employed with the addition of a prime. In general, the scheme is the same as described previously with the distinction that there is no cooperation with the front wheels. The wedge shoes 31' and 32' are applied to the rear wheels and a blanket 23' will be spread out similar to that indicated by 23 when a person takes hold of bar 1' or bar 15', or when it will be struck by these bars.

Referring more particularly to Figures 8 and 9, it will be noted that the invention is represented in a form that is more simplified than that shown in Figures 1 and 2. Although there is in Figures 8 and 9 the device brought in connection only with the front wheels of an automobile, it is obvious from the description that follows that a similar arrangement can be made also in connection with the rear wheels of that automobile so that persons may be protected when the automobile moves backwards. It is also to be mentioned that this modification is adaptable for street cars that may be either steam or electrically propelled. The foremost bars are indicated by 1a and 15a, respectively, and the holding device for the plug 6a is somewhat different from that shown in Figures 1 and 5. First, the plug 6a is so held that the pull exerted upon it comes directly from below and secondly there is no guide 3 nor part 4 and 4a arranged but bar 2a to which is fastened the foremost bar 1a, is placed in guides 50, 51 of a part 52 that is pivoted at 53. The staple part 54 that comprises the pivot 53 and a stop 2c is rigidly secured to a suitable part of the automobile body or chassis, or to the front bumper. Bar 2a is downwardly bent as at 2b and the lower end of this part 2b is formed like the corresponding similar part shown in Figure 5, that is to hold the plug 6a which may have a similar shape to plug 6 of Figure 5. A stop 2d is arranged to prevent part 2b from going farther down.

The corresponding part 9a is in some respect similar in shape to part 9 of Figure 5 and this part 9a is rigid and united with part 54. Connected to the plug 6a are two wires or ropes or chains 10a, 10b, of which the one indicated by 10a is fastened by its other end to a curved bar 17a of metal or wood and the other to a curved bar 18a also of similar material. These bars lie loosely at their right side end in a ring or the like 55, 56, respectively, in such manner that they are thus supported and have their bow directed upwardly whereby a crossbar 57 holds them so that they are positioned in the vertical plane which is determined by the front wheels when they resume the straight forward position. The ropes or chains or wires 10a, 10b hold these bars 17a, 18a suspended and right above the front wheels in such manner that these wheels are not hampered when they make the movements resulting from the steering. If a mud-guard is employed, these bars 17a, 18a should be positioned underneath these respective mud-guards. These bars are broad enough so that at least one part thereof will be always right above the front wheels. The front part of bars 17a, 18a is bent outwardly so that they reach a point that lies further outside than the vertical plane of the respective front wheel. To these outwardly bent parts of the bars 17a, 18a, which might be surrounded by cloth or rubber, or which may be provided with brushes like the shanks 17, 18, are secured the extreme ends of the lower border of the blanket or canvas 23a which is otherwise similarly arranged, as has been explained in connection with the blanket 23. There are also the bars 68', 69' which have a purpose similar to that of bars 68, 69, respectively, of Figures 1, 2 and 13. The part of the bars 17a, 18a that is situated right above the front wheels may have lateral extensions 18b, as shown in Figure 10, and they may be somewhat downward flaring. If a non-flexible material is used for bars 17a, 18a, it may be desirable to form the parts of these bars, that are situated right above the front wheels, of sections that are linked together, as shown in Figure 9. These sections should be linked so that a straightening of these bars is possible when they are in released position, whereby, however, no lateral deviation of the sections can take place. This is simply accomplished by making each slot 18c longitudinal in the direction from front to back and the piece of the next section that enters that slot must also be longitudinally shaped so as to fit to the slot 18c.

At a point indicated by 60 there is a rope or chain 61 fastened to bar 18a and this rope 61 is again passed through a ring 62 situated right in front of the left front wheel. The other end of that rope 61 is fastened to a flat piece of strong leather 63 or of a tough somewhat bendable material that has the purpose to fall down and lie on the ground in the path of the left side front wheel when it will be released from its suspended position. In this suspended position it is held by the rope or wire 64 which is connected to rope 10a or rope 64 may be directly connected to plug 6a.

At the rear end of bar 18a is fastened a rope or chain 65 which has a certain length and the other end of that rope 65 is fastened to a suitable part of the car body. Similar arrangements are also made in connection with bar 17a and the right side front wheel. Instead of using the spring 12, as shown in Figures 1, 2 and 5, there may be employed two rings 73, 74 with relatively large holes. These rings are held by bars 73a, 74a, respectively, which again are fastened to some suitable part of the vehicle body. Stems or short bars 75, 76 are rigidly united with bar 1a and are so arranged that bar 75 is passed through the hole of ring 73 and bar 76 is passed through the hole of ring 74. Through this arrangement it is provided that neither the one nor the other of the ends of bar 1a and bar 15a may hang down. The arrangement is made so, however, that a person can easily move bars 1a and 15a backwards, or downwards whereby bars 75, 76 will have free movement in their rings 73, 74. There may be also a spring employed for each bar 75, 76, but this needs to be a simple leaf spring 77 and 78 which is fastened to the holding bar 73a or 74a whereby the free end of said leaf spring presses slightly upon the portion of bar 75 or 76 that protrudes rearwardly from the respective ring 73, 74, respectively. There may also be a spring 80 (81) arranged so that the slight pressure thereof is exerted upon the rear end of bar 75, 76 respectively whereby bars 1a and 15a are held in their foremost position. In its operation the device of Figures 8 and 9 acts as follows:

In case that a person takes hold of bar 1a or bar 15a this bar will be pulled or pushed down and the part 52 will be moved on its pivot, the result being then that part 2b moves up towards the stop 2c thus allowing the plug 6a to slip out and fall down, and releasing the ropes 10a, 10b, and 64. The same effect takes place when bar 1a or 15a is simply pushed from the front whereby bar 2a will be pushed to the right so that part 2b moving also in that direction will also release the plug 6a.

The front part of bars 17a, 18a will fall immediately to the ground and by this function there is already protection for the person that has been struck by the vehicle because the blanket 23a forms then a protecting curtain between the front wheels and that person. Bars 17a and 18a cannot move backward when their front part slides along the ground because a stop 56a that lies against ring 56 will prevent it. Furthermore, simultaneously with rope 10a will also be released rope 64 and the leather piece 63 (or stiffened strong cloth) falls to the ground whereby in the next moment the front wheel moves upon it whereby rope 61 will be stretched and finally will pull bar 18a forward as far as rope 65 permits it. In this situation the left side front wheel stays on the front half part of the leather piece 63 whereby a braking action is obtained which may be increased by steel points protruding on the underside of said leather piece. It must be remembered also that a strong pressure is then exerted upon the front wheel by bar 18a or its lateral extensions and there may be steel points arranged on the underside of these bars 17a, 18a and on their lateral extensions that will grip the rubber tires of the front wheels and thus stop these wheels from revolving. It is thus shown that the blanket 23a will form a protecting curtain and that a braking action is obtained at the same time.

There will be a simplification when the device is employed in connection with the rear wheels of the automobile because these are not steered and therefore no lateral extensions are necessary in connection with these bars which otherwise will be similar to those indicated by 17a, 18a.

For preventing pedestrians from being hurt when they approach too near the vehicle from the side a device is placed on the front of the wheels that simply will push that person away from the vehicle and so prevent him from being seriously hurt, or from getting under the front or rear wheels. This device consists in part of a vertical bar 90 properly secured to a stable part of the vehicle body and positioned in front of the wheel. Secured to this bar 90 are a plurality of horizontally and rearwardly directed bars 91 that might be somewhat flexible. The bars 91 should be smooth and should preferably be bent outwardly with the outer bow directed to the side so that a person who approaches too near to the vehicle while the latter is in motion will be shoved aside and therefore away from the vehicle by the bars 91. The rear end of each bar 91 should be rolled up so that no person can be hurt by that part.

The fact that it will cause a certain amount of work and some loss of time to replace the several parts to their normal position after a collision has occurred is a reason for the driver of the vehicle to be cautious in driving his car or motor truck, etc., which in turn lessens the usual high number of accidents occurring from collisions with persons or vehicles, etc. The invention is also of such character that it can be inspected at a glance by any policeman if he wants to be informed upon its proper function.

What I claim is:

1. In an automatic protecting device on vehicles, of displaceable bars in front of the vehicle body, a device with members that are extended laterally in front of the front wheels of the vehicle beyond the vertical plane of said front wheels, a blanket whose lower border is stretched between these laterally extended members and held in readiness for being spread, mechanism and means holding said device in suspended position, mechanism adapted to release said device when a person grasps one of said bars or when said bar is pushed backwards at the occurrence of a collision of said vehicle, said blanket arranged so as to form a protecting curtain when said device is released, preventing thereby a person who has been struck by said vehicle from getting under the wheels of that vehicle.

2. In an automatic protecting device on vehicles, of displaceable bars in front of the vehicle body, means adapted to stop the vehicle wheel from turning, means holding said first named means in suspended and therefore normal non-effective position, mechanism adapted to release said second mentioned means and thereby bring said first named means into effective position when said displaceable bars in front of the vehicle body have been moved backwards or downwards from their normal position.

3. In an automatic protecting device on vehicles, of displaceable bars in front of the vehicle body, a device with members that are extended in front of the front wheels, a blanket whose lower border is stretched between the front end parts of said device and folded up in such manner that it displays by itself when the front part of said device falls to the ground, means adapted to stop the vehicle wheels from turning, means holding said device and the first mentioned means in suspended and therefore in normal non-effective position, mechanism adapted to release simultaneously said device and said first mentioned means and bring them into effective position whereby said blanket forms a protecting curtain that prevents a person from getting under the wheels of the vehicle, said first mentioned means moving into effective position for stopping the vehicle wheels from turning.

4. In an automatic protecting device on vehicles, a device including a blanket held in front of the vehicle body in suspended position which is the normal, non-effective position, a similar device in the rear of the vehicle body held also in suspended normal position, both devices adapted to be released to effective position in which the blanket forms then a protecting curtain, mechanism in front of the vehicle body and mechanism in the rear of the vehicle body for effecting the release of said devices when a person or other body or structure operates said mechanism by simply pushing the foremost part thereof, and a device for exerting a braking action held simultaneously with said first mentioned device in suspended non-effective position and moved to effective position when said first mentioned devices are released to effective position.

5. In an automatic protecting device on vehicles, of two bars in front of the vehicle body extended over the whole width and outside the wheels of the vehicle and even farther, a rearwardly directed bar united with one of said first mentioned bars and a pivoted part operatively connected to said rearwardly directed bar, a pincer-like means of which one part is stable and the other movable and operable by said bars, a plug-shaped means held by said pincer-like means, a cord or the like connected to said plug-shaped means and to a device that includes a blanket which is thus held in suspended position, said movable part of the pincer-like means adapted to move away from said plug-shaped means and permit the latter to fall down, thus releasing said device when either of said first mentioned two bars is pushed downwards or backwards by a person or other body or structure.

6. In an automatic protecting device on vehicles, of a device comprising two bars supported at one end and suspended on the other end, a blanket of suitable material folded and the lower border of which is stretched between the suspended end parts of said bars, two other bars of which one is provided with teeth or points and said blanket passed through the space left between said two other bars, said blanket adapted to unfold itself when said first mentioned bars drop at their suspended end parts, and said blanket adapted to hook in on said teeth or points when a person pushes that lower portion of the blanket towards the adjacent wheels of the vehicle, thus stretching that portion of the blanket which then prevents it from getting under said wheels and which therefore forms a protecting curtain for the person that was struck by the vehicle.

7. In an automatic protecting device on vehicles, of a device comprising two bars supported at one end and suspended at the other, a blanket for protecting purposes secured to the suspended ends of said bars, means for moving said bars forward, said last mentioned means arranged to cooperate with some of the vehicle wheels for effecting said forward moving when said wheels turn and the suspended parts of said bars are released to effective position thus stretching said blanket in a manner that a person who has been struck by the vehicle will not fall to the ground but will fall upon the outstretched blanket, and means preventing the backward moving of said bars when the normally suspended ends thereof lie on the ground.

8. In an automatic protecting device on vehicles, of a device including bars arranged above some of the vehicle wheels, one end of said bars supported and the other end thereof suspended, a rope or the like attached to a part of one of said bars, a flat piece of tough, though somewhat bendable material attached to said rope or the like and held in suspended position in front of said vehicle wheel, so that at the releasing of said piece of material same will fall to the ground in such manner that said wheel moves upon it, means causing thereby said rope or the like to be stretched and the respective bar pulled forward and downward, said bar arranged so as to exert thereby pressure upon said wheel thus stopping it from turning, the same arrangement also made in connection with the other of said bars, said bars having a blanket attached to their suspended ends that is folded up but stretched out when said bars are pulled forward, said blanket forming a protecting curtain when said bars are dropped to effective position.

9. In an automatic protecting device on vehicles, of a holding and releasing device comprising a pincer-like part and a plug-shaped part normally held by said pincer-like part, said plug-shaped part grooved and the part of said pincer-like part that touches said plug-shaped part also grooved in such manner that the elevations formed between the grooves on said plug-shaped part enter and fit to the grooves of said pincer-like part.

10. In an automatic protecting device on vehicles, of displaceable bars in front of the vehicle body having a centrally arranged bar connected to one of said displaceable bars and to a mechanism that normally holds in suspension a device that includes a protecting blanket and a means for exerting a braking action upon the vehicle, other bars connected to said displaceable bar and passed through a ring-shaped member in such manner that permit said displaceable bars to be pushed downwards or backwards or simultaneously in both these directions, and springs arranged for merely holding these displaceable bars in normal position but yielding when a person pushes against these bars.

11. In an automatic protecting device on vehicles, of a vertical bar in front of the vehicle wheel having a substantial length which corresponds with the height of the wheel and nearly reaches the ground, horizontal bars fastened by one of their ends to said vertical bar and having the other ends free for rendering them flexible to a large extent and bent outwardly and rearwardly so that persons approaching too near to that vehicle while it is moving will be shoved aside by the horizontally arranged bars but not hurt thereby due to the flexibility thereof.

12. In an automatic protecting device on vehicles, of a vertical bar in front of the vehicle wheel having a substantial length which corresponds to the height of that wheel and nearly reaches the ground, horizontal bars fastened by one of their ends to said vertical bar and having the other ends free and directed outwardly and rearwardly, the free ends of these horizontal bars being rounded and the bars themselves being made flexible for not hurting persons who are being shoved away by them.

13. In an automatic protecting device on vehicles, of bars arranged in front and in the rear of the body of said vehicle, said bars held in such horizontal plane and as far away from other parts of said vehicle that grown-up persons coming too near or being struck by the moving vehicle are given a chance to hold themselves on said bar so that they might not be thrown to the ground, said bars being surrounded with soft material for preventing injuries to said persons.

14. In an automatic protecting device on vehicles, of bars held in front and in the rear of the body of said vehicle, said bars arranged in such horizontal plane and as far away from other parts of said vehicle that any small person, such as a child, that has been struck or that inevitably will be struck by said vehicle, will have a chance to grasp that bar and hold itself thereon so that he might not be thrown to the ground, said bars being indirectly supported by springs and being padded for preventing injuries to said person.

In testimony whereof, I have affixed my signature.

HEINRICH KARL.